United States Patent
Rejman

(10) Patent No.: US 11,821,468 B2
(45) Date of Patent: Nov. 21, 2023

(54) POSITIONING DEVICE AND METHOD FOR SHAFTS

(71) Applicant: PRATT & WHITNEY CANADA CORP., Longueuil (CA)

(72) Inventor: Marcin Rejman, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 766 days.

(21) Appl. No.: 16/184,255

(22) Filed: Nov. 8, 2018

(65) Prior Publication Data

US 2020/0149592 A1 May 14, 2020

(51) Int. Cl.
F16D 1/10 (2006.01)
F16D 1/12 (2006.01)

(52) U.S. Cl.
CPC ............... *F16D 1/101* (2013.01); *F16D 1/12* (2013.01); *F16D 2001/103* (2013.01); *Y10T 403/7033* (2015.01)

(58) Field of Classification Search
CPC ... F16D 1/10; F16D 1/101; F16D 1/12; F16D 2001/102; F16D 2001/103; F16D 3/06; F05D 2260/403; Y10T 403/157; Y10T 403/158; Y10T 403/159; Y10T 403/182; Y10T 403/12; Y10T 403/125; Y10T 403/32549; Y10T 403/7028; Y10T 403/7031; Y10T 403/7032; Y10T 403/7035; Y10T 403/556; Y10T 403/56; Y10T 403/7026; Y10T 403/7033
USPC .................. 464/157, 158, 159, 182
See application file for complete search history.

(56) References Cited

U.S. PATENT DOCUMENTS

| | | | | | |
|---|---|---|---|---|---|
| 4,606,671 | A | * | 8/1986 | Rasmussen | F16D 1/06 403/359.5 |
| 4,900,177 | A | * | 2/1990 | Ferguson | F16D 1/06 403/13 |
| 5,464,251 | A | * | 11/1995 | Daumal Castellon | F16C 3/03 188/371 |
| 5,836,713 | A | * | 11/1998 | Brassert | F16D 1/108 403/359.5 |
| 6,033,310 | A | * | 3/2000 | Faulkenberry | F16C 3/03 464/26 |
| 6,241,616 | B1 | * | 6/2001 | Lightcap | F16C 3/03 464/158 |
| 7,288,029 | B1 | * | 10/2007 | Lyon | F16C 3/03 403/359.6 |
| 9,303,695 | B2 | * | 4/2016 | Choi | F16D 1/068 |
| 9,476,459 | B2 | | 10/2016 | Lemmers, Jr. | |
| 10,415,645 | B2 | * | 9/2019 | Katayama | F16D 1/116 |

(Continued)

FOREIGN PATENT DOCUMENTS

WO WO-9605101 A1 * 2/1996 ............... F16D 1/06

*Primary Examiner* — Amber R Anderson
*Assistant Examiner* — Kevin J Baynes
(74) *Attorney, Agent, or Firm* — NORTON ROSE FULBRIGHT CANADA LLP

(57) ABSTRACT

A shaft assembly for an aircraft engine includes a first shaft coupled to a second shaft with a splined coupling made of an electrically-insulating material. The first and second shafts and the splined coupling are rotatable about an axis. A positioning device is mounted to the splined coupling and to the first shaft about the axis. The positioning device is displaceable along the axis relative to the first shaft to vary an axial position of the splined coupling.

12 Claims, 4 Drawing Sheets

(56) References Cited

U.S. PATENT DOCUMENTS

2002/0192021 A1  12/2002  Wilson et al.
2012/0251234 A1  10/2012  Lemmers, Jr.

* cited by examiner

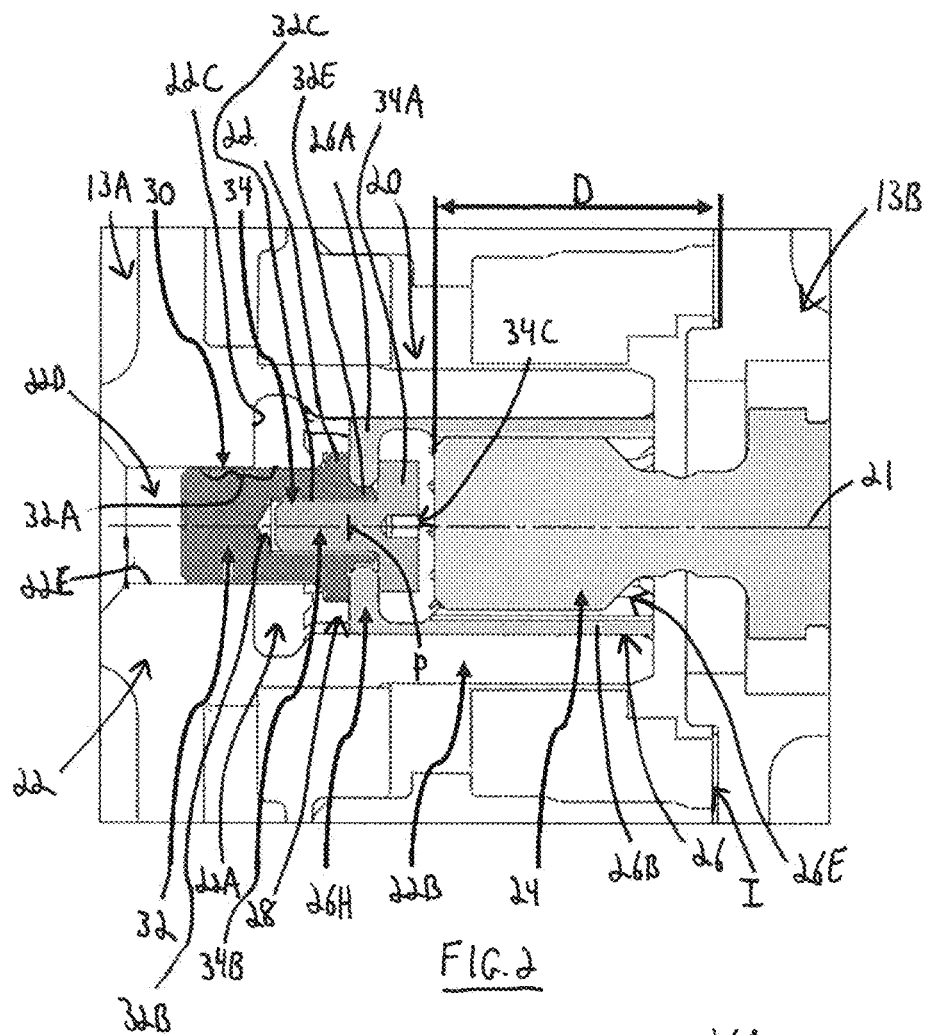
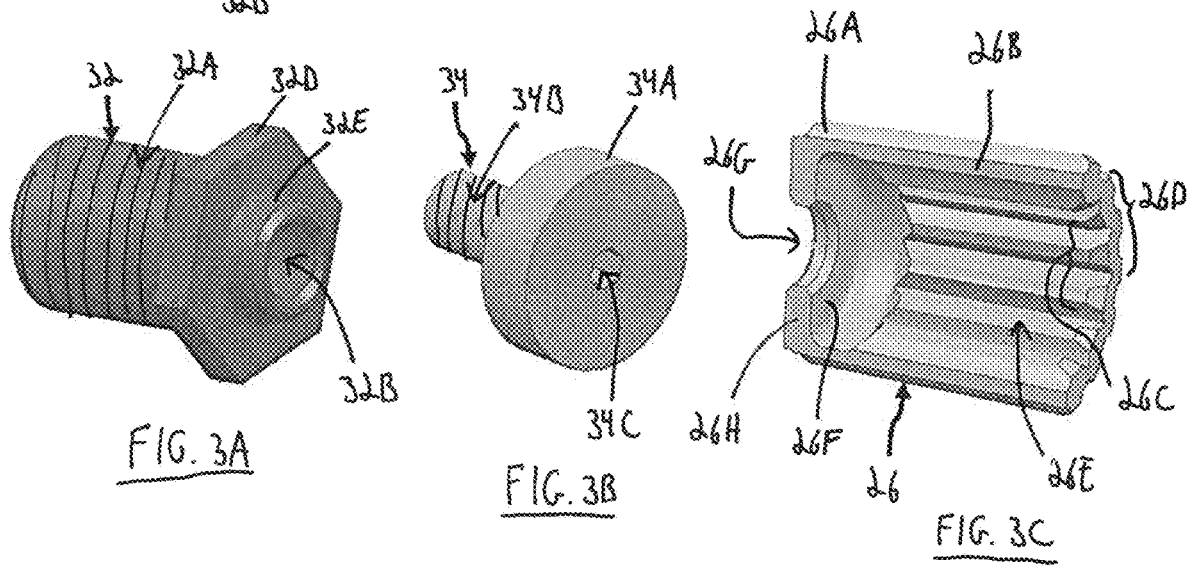
FIG. 2
FIG. 3A   FIG. 3B   FIG. 3C

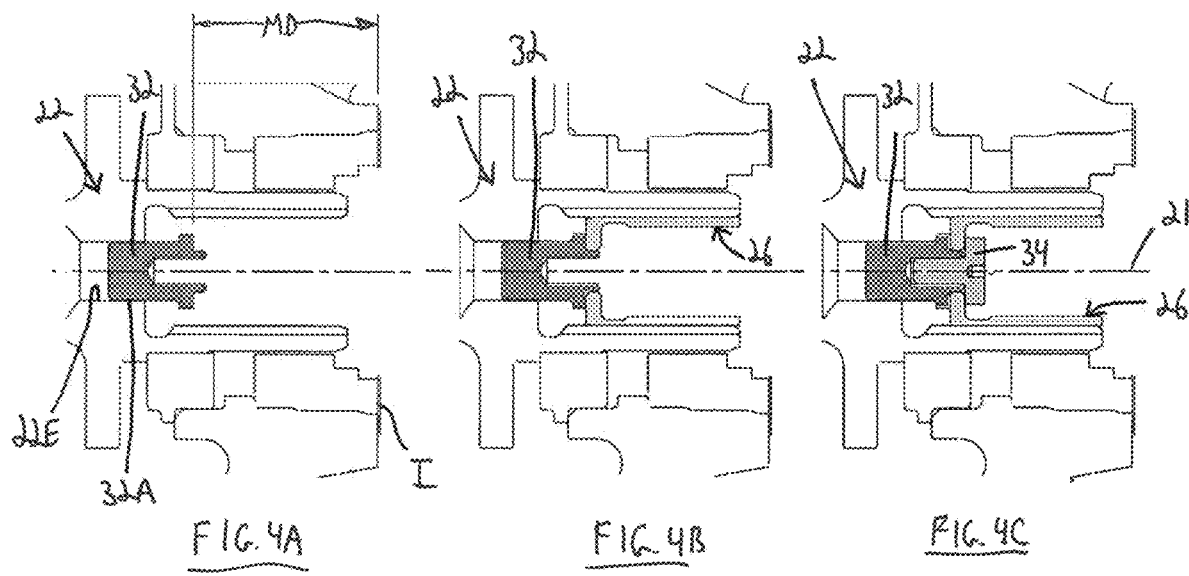

11,821,468 B2

POSITIONING DEVICE AND METHOD FOR SHAFTS

TECHNICAL FIELD

The application relates generally to rotatable shafts in aircraft engines and, more particularly, to a device and method for positioning one aircraft engine shaft relative to another.

BACKGROUND

In gearboxes for gas turbine engines, such as the accessory gearbox (AGB), a drive shaft may be connected to a driven shaft with a spline insert. The driven shaft or a component thereof may need to be spaced apart from the drive shaft a distance set by certification or aerospace standards to prevent electrostatic discharge from an accessory to the drive shaft of the AGB. However, the driven shaft of the accessory is sometimes incapable of meeting the standard, which may require the position of the drive shaft to be changed so that the required distance is respected.

SUMMARY

In one aspect, there is provided an aircraft engine shaft assembly, comprising: a first shaft coupled to a second shaft with a splined coupling made of an electrically-insulating material, the first and second shafts and the splined coupling being rotatable about an axis, a positioning device mounted to the splined coupling and to the first shaft about the axis, the positioning device being displaceable along the axis relative to the first shaft to vary an axial position of the splined coupling.

In another aspect, there is provided a coupling assembly for rotatably coupling a first shaft of an aircraft engine and a second shaft of the aircraft engine, the coupling assembly comprising: a splined coupling made of an electrically-insulating material and having an inner wall with an inner spline arrangement engageable with the second shaft, and an outer wall with an outer spline arrangement engageable with the first shaft, the splined coupling having a cavity delimited by the inner wall and an end wall having an opening therein; and a positioning device mountable to the splined coupling and to the first shaft, the positioning device being displaceable along an axis of rotation of the first and second shafts to vary an axial position of the splined coupling.

In another aspect, there is provided a method for coupling a first shaft of an aircraft engine to a second shaft of the aircraft engine, the method comprising: mounting a positioning device to the first shaft to establish an axial position of the second shaft relative to the first shaft along an axis of rotation of the first and second shafts; mounting a splined coupling made of an electrically-insulating material to the positioning device, and rotationally coupling the splined coupling to the first shaft; and rotationally coupling the second shaft to the splined coupling to position the second shaft at the axial position.

DESCRIPTION OF THE DRAWINGS

Reference is now made to the accompanying figures in which:

FIG. 2 is an enlarged cross-sectional view of a shaft assembly of the gas turbine engine of FIG. 1;

FIG. 3A is a perspective view of a first portion of a positioning device of the shaft assembly of FIG. 2;

FIG. 3B is a perspective view of a second portion of the positioning device of the shaft assembly of FIG. 2;

FIG. 3C is a perspective view of a splined coupling of the positioning device of the shaft assembly of FIG. 2;

FIG. 4A is a cross-sectional view of part of the shaft assembly of FIG. 2, showing the first portion of the positioning device;

FIG. 4B is a cross-sectional view of part of the shaft assembly of FIG. 2, showing the first portion of the positioning device and the splined coupling;

FIG. 4C is a cross-sectional view of part of the shaft assembly of FIG. 2, showing the first portion of the positioning device, the splined coupling, and the second portion of the positioning device;

DETAILED DESCRIPTION

Figure 1:
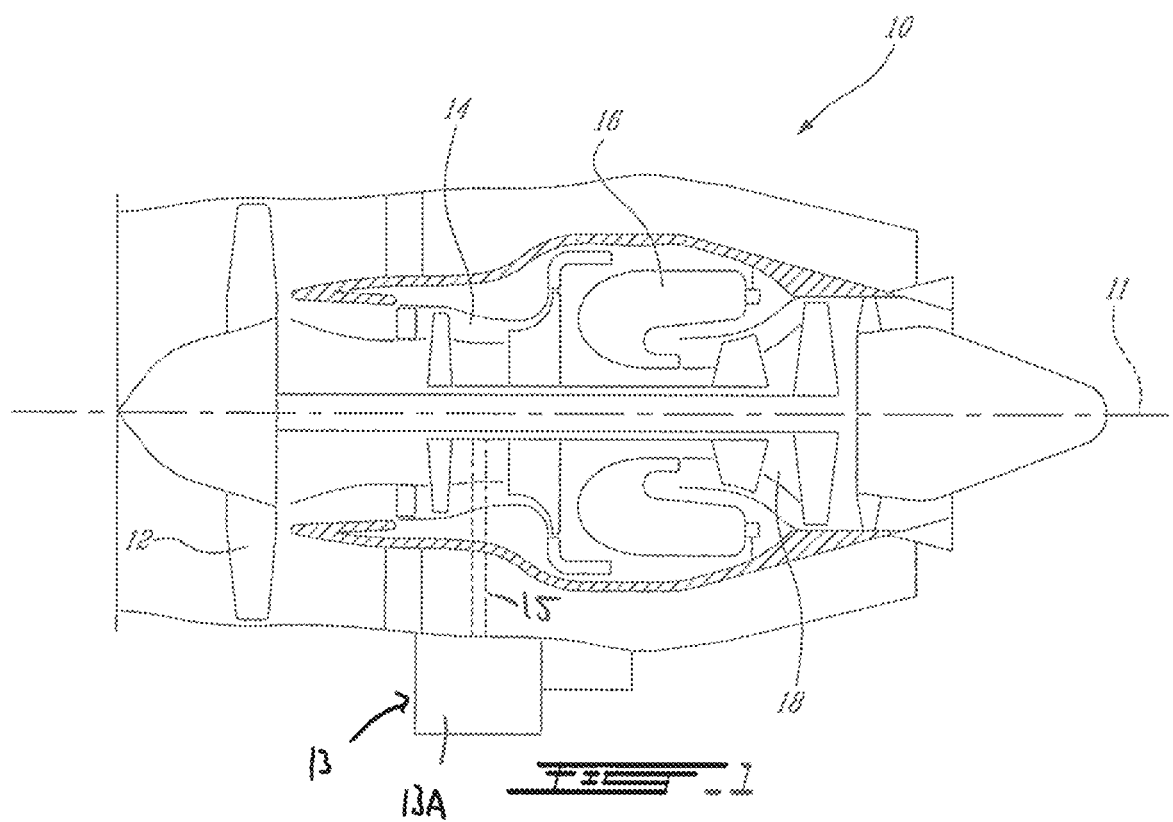
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Components of the engine 10 are rotatable about a longitudinal center axis 11 of the engine 10.

The engine 10 has one or more gearboxes 13. One possible gearbox 13 for the engine 10 is shown in FIG. 1 as an accessory gearbox (AGB) 13A. A drive shaft 15 extends between the turbomachinery of the engine 10 and the AGB 13A, and operates to drive the accessories of the AGB 13A. The drive shaft 15 may be driven by the turbomachinery, and in turn drives the accessories of the AGB 13A.

FIG. 2 is an enlarged cross-sectional view of part of the AGB 13A. The AGB 13A includes a shaft assembly 20 of the engine 10 which, in the depicted embodiment, includes a first shaft 22 which is driven through suitable gearing by the drive shaft 15 or other torque source, and a second shaft 24 which is driven by the first shaft 22. The first and second shafts 22,24 are coupled together by a splined coupling 26 so that the rotational motion of the first shaft 22 is transferred to the second shaft 24. In the depicted embodiment, the first shaft 22 is a shaft of the AGB 13A, and the second shaft 24 is a shaft of the accessory 13B driven by the AGB 13A, though other arrangements are also considered. In the depicted embodiment therefore, the first shaft 22 is a "drive" shaft of the engine 10 and the second shaft 24 is a "driven" shaft of the engine 10. The first and second shafts 22,24 and the splined coupling 26 rotate about an axis 21. In the depicted embodiment, the first and second shafts 22,24 and the splined coupling 26 are co-axial, such that the axis 21 is common to the first and second shafts 22,24 and the splined coupling 26, with a 1:1 transmission ratio. The first and second shafts 22,24 are both made from a metallic material.

The splined coupling 26 is made of an electrically-insulating material. As an example, the splined coupling 26 is made of a non-metallic material. The material of the splined coupling 26 helps to electrically insulate the first shaft 22, and reduce or prevent electrostatic discharges from the accessory 13B being transferred to the AGB 13A via the coupled metallic first and second shafts 22,24. The splined coupling 26 may be used at the interface of the accessory 13B, where the accessory 13B may be supplied by a purchaser of the engine 10, and the AGB 13A. The non-metallic and/or electrically-insulating material reduces or prevents electrostatic discharges from the accessory 13B going through the metallic first and second shafts 22,24. The splined coupling 26 helps protect the first shaft 22 from damage because the splined coupling 26 will itself experience wear and degrade instead of the first shaft 22. The worn or damaged splined coupling 26 may be replaced during an engine overhaul or during engine maintenance. The electrically-insulating material may be any material suitable to achieve this functionality. Some non-limiting examples of suitable electrically-insulating materials for the splined coupling 26 include plastic, ceramic, non-metallic materials, other polymeric materials, and combinations thereof. Some or all of a body 26A of the splined coupling 26 may be made from the electrically-insulating material to provide the splined coupling 26 with the functionality attributed thereto herein.

In the embodiment shown in FIG. 2, the first shaft 22 defines a shaft cavity 22A in an interior of an end of the first shaft 22. The shaft cavity 22A is open at one of its ends, and at least partially closed at the other of its ends. The shaft cavity 22A is delimited by one or more shaft cavity side walls 22B, and a shaft cavity end wall 22C which defines the end or "bottom" of the shaft cavity 22. In the depicted embodiment, the shaft cavity 22 has a cylindrical shape, such that the shaft cavity side wall 22B is annular in shape. Other shapes for the shaft cavity 22 and the shaft cavity side wall 22B are possible. A threaded recess 22D extends into the first shaft 22 from the shaft cavity end wall 22C in a direction parallel to the axis 21. The threaded recess 22D is delimited by a recess wall 22E being threaded along some or all of its length. The threaded recess 22D extends into the first shaft 22 in a direction toward the other end of the first shaft 22. The threaded recess 22D is closed at one end, and open at the other, and has a cylindrical shape in the depicted embodiment.

The second shaft 24 and the splined coupling 26 are positioned within the shaft cavity 22A. Referring to FIGS. 2 and 3C, body 26A of the splined coupling 26 has a coupling cavity side wall 26B. The coupling cavity side wall 26B defines a radially-inner surface and a radially-outer surface. The radially-inner surface may be provided with an inner spline arrangement 26C, or other coupling features. The radially-outer surface may be provided with an outer spline arrangement 26D, or other coupling features. Each of the inner and outer spline arrangements 26C,26D is a configuration of ridges or teeth that mesh with grooves or splines in a mating piece (e.g. the first and second shafts 22,24) to transfer torque. For example, the inner spline arrangement 26C may have a configuration of male splines to mate or mesh with corresponding female splines on the second shaft 24. The inner spline arrangement 26C engages or meshes with a splined outer surface of the second shaft 24, and the outer spline arrangement 26D engages or meshes with a splined surface of the shaft cavity side wall 22B of the first shaft 24. This arrangement of the splined coupling 26 and the first and second shafts 22,24 will cause rotational movements and torque from the first shaft 22 to cause rotation of the splined coupling 26 about the axis 21, and to in turn rotate the second shaft 24 about the axis 22. Little or no slip will be experienced between the first shaft 22 and the splined coupling 26, and between the splined coupling 26 and the second shaft 24. The first and second shafts 22,24 are therefore indirectly mounted to one another via the splined coupling 26. The splined coupling 26 shown in FIG. 2 is disposed within the shaft cavity 22A about the second shaft 24 and between the first and second shafts 22,24. It will thus be appreciated that, at least in the depicted embodiment, components of the shaft assembly 20 are assembled inside the first shaft 22 which may be part of the AGB 13A.

The splined coupling 26 has a coupling cavity 26E delimited by the coupling cavity side wall 26B. The coupling cavity 26E is disposed within and is part of the shaft cavity 22A. The coupling cavity 26E is open at one of its ends to receive the second shaft 24. In the embodiment shown in FIGS. 2 and 3C, the coupling cavity 26E has a generally cylindrical shape (discounting the coupling features on the radially-inner and outer surfaces), such that the coupling cavity side wall 26B is annular in shape. Other shapes for the coupling cavity 26E and the coupling cavity side wall 26B are possible. Because of its position within the shaft cavity 22A of the first shaft 22, the splined coupling 26 may be referred to as a splined "insert". The splined coupling 26 is not limited to having the annular shape of the depicted embodiment, and may have any other suitable shape to transfer rotation from the first shaft 22 to the second shaft 24, and to electrically insulate the first shaft 22.

The body 26A of the splined coupling 26 may have a coupling cavity end wall 26F which delimits one of the ends of the coupling cavity 26E. An opening 26G extends through the coupling cavity end wall 26F. In the depicted embodiment, the opening 26G is coaxial with the axis 21 of rotation of the splined coupling 26. The opening 26G is spaced radially inwardly from the coupling cavity side wall 26B, such that the coupling cavity end wall 26F takes the form of a circumferential flange 26H. Referring to FIGS. 2 and 3C, it will be appreciated that the splined coupling 26 has an L-shaped cross-section on either side of a symmetrical axis coincident with axis 21. The flange 26H and the coupling cavity side wall 26B are transverse to each other. The flange 26H and the coupling cavity side wall 26B are perpendicular to each other in the depicted embodiment. The flange 26H may have a radial orientation and the coupling cavity side wall 26B has an axial orientation, and is parallel to the axis 21 in the depicted embodiment.

Referring to FIG. 2, the second shaft 24 is mounted to the splined coupling 26 at a desired distance D from a reference feature. In the depicted embodiment, the distance D is an axial distance (i.e. measured parallel to the axis 21) between an end of the second shaft 24 and an interface I between the AGB 13A and the accessory 13B. The distance D may be established by aerospace or certification standards and thus should be respected by the second shaft 24 in order to keep maximum spline engagement with the first shaft 22 of the AGB 13A. The distance D may be measured between the end of the second shaft 24 and another reference component in alternate embodiments. The coupling cavity side wall 26B of the splined coupling 26 may have a radially-inwardly protruding flange or other stop to fix the axial position of the end of the second shaft 24 at the distance D, and to prevent axial displacement of the second shaft 24 relative to the splined coupling 26, and further into the coupling cavity 26E.

Depending on the accessory 13B being used, a length of the second shaft 24 may be too long or too short to satisfy the aerospace standard for the distance D when the second shaft 24 is coupled to the first shaft 22 with the splined coupling 26. It may therefore be necessary to adjust an axial position P of the splined coupling 26 to ensure that the aerospace standard distance D is respected, as now described in greater detail.

FIG. 2 shows a coupling assembly 28 for coupling the first and second shafts 22,24, and for establishing the axial position P of the splined coupling 26 in order to achieved the desired value for the distance D. The coupling assembly 28 includes the splined insert 26, and a positioning device 30. The positioning device 30 is any suitable component or arrangement of components that allows the axial position P of the splined coupling 26 to be established. The positioning device 30 achieves this functionality because some or all of the components of the positioning device 30 are displaceable along the axis 21, either axially toward or away from a reference point of the first shaft 22, to vary and set the desired axial position P of the splined coupling 26, and thus the desired distance D and position of the second shaft 24.

The positioning device 30 therefore helps to adjust or select the axial position of one shaft 22,24 relative to another. By being displaceable along the axis 21 of the first and second shafts 22,24, the positioning device 30 may be used to pre-select the desired axial position P of the splined coupling 26, and thus of one shaft 22,24 relative to the other. The positioning device 30 allows for the distance D to be respected without having to change the position of the first shaft 22, which may be difficult, because the position of second shaft 24 relative to first shaft 22 can be adjusted via the splined coupling 26. It is therefore possible to adjust the axial position of the second shaft 24 without complicated features. The coupling assembly 20 helps in accommodating second shafts 24 of various aircraft engine accessories 13B and having various lengths for use with the standard first shaft 24 of the aircraft engine AGB 13A.

One possible embodiment of the positioning device 30 is described with reference to FIGS. 2 to 3B. The positioning device includes a first portion 32 coupled to a second portion 34. The first portion 32 is mounted to the first shaft 22, and the second portion 34 is mounted to the splined coupling 26. The first and second portions 32,34 of the positioning device 30 therefore help to secure the splined coupling 26 to the first shaft 22. The first and second portions 32,34 are rotatable about the axis 21 as a result of the rotation of the first shaft 22 and the splined coupling 26. In the depicted embodiment, the first and second portions 32,34 of the positioning device 30 are in the form of a threaded bolt or like threaded fastener, and are made from a metallic material. Other configurations are possible.

In the depicted embodiment, the first portion 32 is the component of the positioning device 30 which is displaceable along the axis 21 with respect to the first shaft 22, in order to establish the axial position P of the splined coupling 26. In order to displace relative to the first shaft 22, the first portion 32 includes a threaded segment 32A occupying some or all of an area of an outer wall of the first portion 32. The first portion 32 is insertable into the threaded recess 22D of the first shaft 22 via the open end thereof. To displace the first portion 32 relative to the first shaft 22 and change the axial position P, the first portion 32 is rotated so that threaded segment 32A engages the threaded recess wall 22E, and moves along the threads in a direction parallel to the axis 21 until the desired position of the positioning device 30 is reached. If desired or necessary, the thread of the threaded segment 32A may be a self-locking thread to prevent the first portion 32 from being displaced out of the threaded recess 22D of the first shaft 22 during rotation of the first shaft 22. Alternatively, the threaded recess wall 22E might have a right-handed thread, and the threaded segment 32A might have a left-handed thread. Other configurations and arrangements of the components are possible to prevent relative rotation between them during rotation of the first shaft 22.

Referring to FIGS. 2 and 3B, the second portion 34 of the positioning device 30 is used to secure the splined coupling 26 to the first portion 32, and thus to the first shaft 22. The second portion 34 includes a circumferential flange 34A or bolt head which can be tightened against the circumferential flange 26H of the splined coupling 26. The second portion 34 also has a threaded segment 34B which extends away from the flange 34A in a direction parallel to the axis 21, and in a direction toward the threaded recess 22D of the first shaft 22. The second portion 34 in the depicted embodiment is therefore coaxial with the axis 21, and rotatable thereabout. The threaded segment 34B of the second portion 34 extends through the opening 26G in the coupling cavity end wall 26F of the splined coupling 26, so that the threaded segment 34B can be coupled to the first portion 32 to connect the first and second portions 32,34 of the positioning device 30 together. More particularly, and as best shown in FIG. 2, the threaded segment 34B of the second portion 34 is disposed in an internal cavity 32B of the first portion 32, which is delimited by an internal threaded wall 32C. The threaded segment 34B of the second portion 34 engages the internal threaded wall 32C and is displaceable with respect to the internal threaded wall 32C. The internal cavity 32B is threaded along some or all of its length, and is closed at one of its ends in the depicted embodiment. In an alternate embodiment, the internal cavity 32B is open at both ends. The internal cavity 32B is disposed in an interior of the first portion 32 and is coaxial with the first portion 32.

In order to couple the first and second portions 32,34, the threaded segment 34B of the second portion 34 is inserted into the internal cavity 32B of the first portion 32, which is already positioned in the threaded recess 22D of the first shaft 22. The bolt head 34A is then rotated to thread and displace the threaded segment 34B along the internal threaded wall 32C in the axial direction. This is continued to abut the bolt head 34A against the flange 26H of the splined coupling 26. The bolt head 34A is rotated to tighten it against the flange 26H of the splined coupling 26 to clamp or sandwich the flange 26H between the first portion 32 and the second portion 34. In the depicted embodiment, the first portion 32 has a clamping feature 32D which abuts against the flange 26H of the splined coupling 26. In the depicted embodiment, the clamping feature 32D is in the form of a circumferential flange extending radially outwardly from the outer wall of the first portion 32, and which abuts and is tightened against an opposite side of the flange 26H than the side of the flange 26H against which the bolt head 34A is abutted and tightened. The first portion 32 also has a collar portion 32E being circumferential in shape and disposed in the opening 26G of the splined conduit 26 between the threaded segment 34B of the second portion 34 and the flange 26H. If desired or necessary, the thread of the threaded segment 34B may be a self-locking thread to prevent the second portion 34 from being displaced out of the internal cavity 32B of the first portion 32 during rotation of the first portion 32. Alternatively, the internal threaded wall 32C might have a right-handed thread, and the threaded segment 34B might have a left-handed thread. Other configurations and arrangements of the components are possible to prevent relative rotation between them during rotation of the first shaft 22. For example, the threaded segment 32A of the first portion 32 may have a segment with a non-circular cross-sectional shape corresponding to a similar non-circular cross-sectional shape of the flange 26H delimiting the opening 26G of the splined coupling 26. In the depicted embodiment, the flange 34A of the second portion 34 has a tool recess 34C extending inwardly from an outer surface of the flange 34A in a direction parallel to the axis 21. The tool recess 34C is configured to engaged a tool used to rotate the second portion 34 about the axis 21. The tool recess 34C may therefore be delimited by any number of walls in order to provide no-slip engagement with the rotation tool. For example, in the depicted embodiment, the tool recess 34C is delimited by six recess walls defining a hexagonal shape.

Referring to FIG. 2, part of the positioning device 30 (e.g. the flange 34A of the second portion 34) is disposed in the coupling cavity 26E of the splined coupling 26, and part of the positioning device 30 (e.g. the threaded segment 34B of the second portion 34, and the first portion 32) extends out of coupling cavity 26E and is disposed in the shaft cavity 22A. In the depicted embodiment, the combination of the threaded first and second portions 32,34 and the splined coupling 26 allows for the axial position P of the splined coupling 26 to be adjusted.

Referring to FIGS. 4A to 4C, there is disclosed a method for coupling the first shaft 22 to the second shaft 24 (not shown in FIGS. 4A to 4C). The method includes steps, which are optionally performed sequentially. The method includes mounting the positioning device 30 or part thereof, such as the first portion 32, to the first shaft 22 to establish a position of the second shaft 24 relative to the first shaft 22 along the axis 21. As shown in FIG. 4A, a mounting distance MD is predetermined and is defined between the interface I and part of the first portion 32. In the depicted embodiment, this position is achieved by screwing the threaded segment 32A of the first portion 32 along the recess wall 22E of the first shaft 22 until a distal end of the first portion 32 is in the desired axial position, or until the mounting distance MD is achieved. The method includes mounting the splined coupling 26 to the positioning device 30, such as by clamping part of the splined coupling 26 between the first and second portions 32,34. The method includes rotationally coupling the splined coupling 26 to the first shaft 22, and rotationally coupling the second shaft 24 to the splined coupling 26 to position the second shaft 24 at the desired position along the axis 21.

Figure 5A:
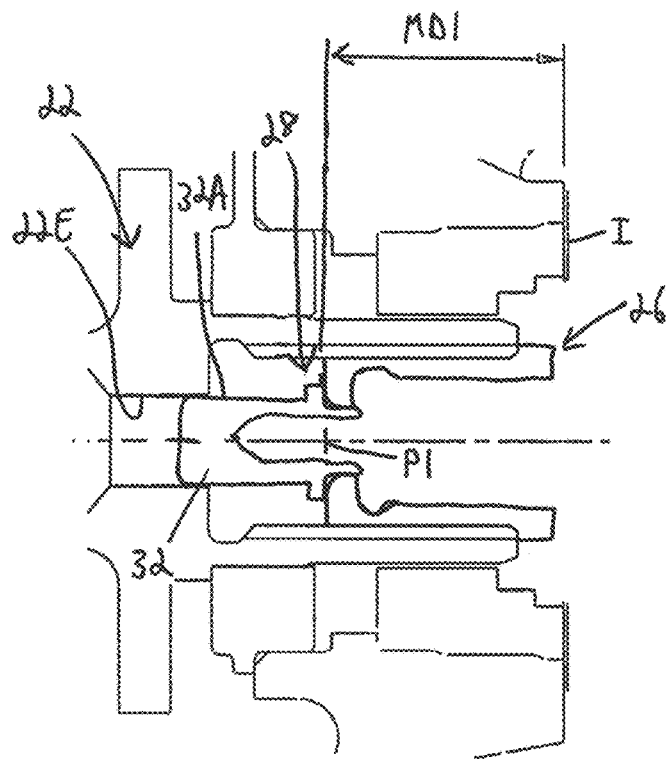
FIG. 5A is a cross-sectional view of the shaft assembly of FIG. 2, showing another axial position of a second shaft of the shaft assembly.
Figure 5B:
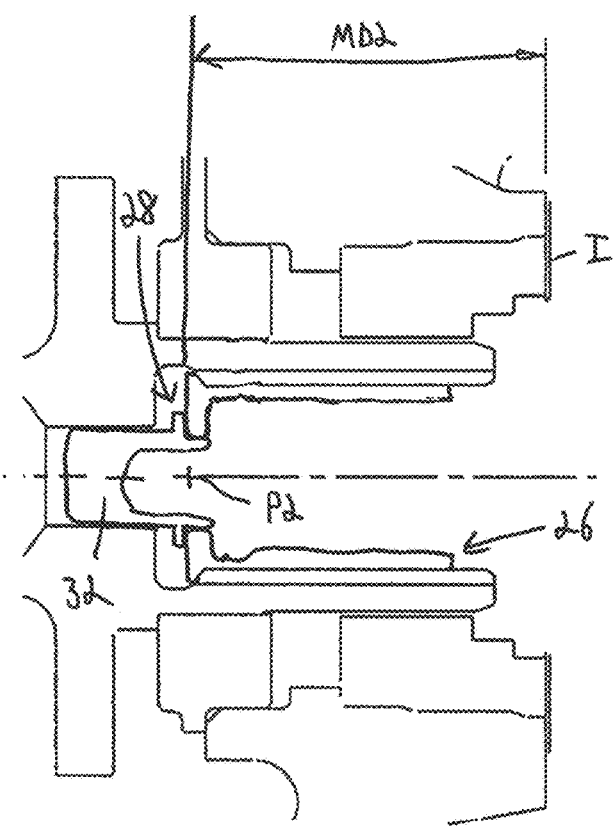
FIG. 5B is a cross-sectional view of the shaft assembly of FIG. 2, showing yet another axial position of the second shaft of the shaft assembly.

FIGS. 5A and 5B show how other axial positions P for the splined insert 26, and thus of the second shaft 24, can also be selected using the coupling assembly 28.

Referring to FIG. 5A, a first mounting distance MD1 is predetermined and is defined between the interface I and part of the first portion 32. In the depicted embodiment, the first axial position P1 is achieved by screwing the threaded segment 32A of the first portion 32 along the recess wall 22E of the first shaft 22 until a distal end of the first portion 32 is in the desired position, or until the first mounting distance MD1 is achieved. The splined coupling 26 is then mounted to the positioning device 30 at the desired first axial position P1. The same is done in FIG. 5B, where it can be seen that the second mounting distance MD2 is greater than the first mounting distance MD1, and the second axial position P2 of the splined coupling 26 (and thus of the second shaft 24) is different from the first axial position P1.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine shaft assembly, comprising:
a first shaft coupled to a second shaft with a splined coupling made of an electrically-insulating material, the first and second shafts and the splined coupling being rotatable about an axis; and
a positioning device mounted to the splined coupling and to the first shaft about the axis, the positioning device being rotatable relative to the first shaft to axially displace the positioning device and the second shaft along the axis relative to the first shaft, between a first device axial position and at least another device axial position, to control an axial positon of the splined coupling and the second shaft relative to the first shaft;
wherein the positioning device and the second shaft are fixed in position relative to the first shaft in the first device axial position and in the at least another device axial position, the positioning device in the first device axial position spacing the first shaft axially apart from the second shaft a first axial distance, the positioning device in the at least another device axial position spacing the first shaft axially apart from the second shaft a second axial distance, the first axial distance being different from the second axial distance, the positioning device including a first portion coupled to a second portion, the first portion mounted to the first shaft, and the second portion mounted to the splined coupling, the first portion of the positioning device being displaceable along the axis relative to the first shaft.

2. The aircraft engine shaft assembly as defined in claim 1, wherein the positioning device includes an outer threaded segment and the first shaft includes a threaded recess, the outer threaded segment of the positioning device mounted in the threaded recess of the first shaft and displaceable relative thereto.

3. The aircraft engine shaft assembly as defined in claim 1, wherein the second portion includes a flange mounted to the splined coupling and a threaded segment extending away from the flange through an opening in the splined coupling, the threaded segment coupled to the first portion of the positioning device.

4. The aircraft engine shaft assembly as defined in claim 3, wherein the first portion of the positioning device includes an internal cavity delimited by an internal threaded wall, the threaded segment of the second portion disposed in the internal cavity and engaged with the internal threaded wall.

5. The aircraft engine shaft assembly as defined in claim 1, wherein part of the second shaft is disposed within a shaft cavity defined in an end of the first shaft, the splined coupling disposed within the shaft cavity about the second shaft and between the first and second shafts.

6. An aircraft engine shaft assembly, comprising:
a first shaft coupled to a second shaft with a splined coupling made of an electrically-insulating material, the first and second shafts and the splined coupling being rotatable about an axis; and
a positioning device mounted to the splined coupling and to the first shaft about the axis, the positioning device being rotatable relative to the first shaft to axially displace the positioning device and the second shaft along the axis relative to the first shaft, between a first device axial position and at least another device axial position, to control an axial positon of the splined coupling and the second shaft relative to the first shaft;
wherein the positioning device and the second shaft are fixed in position relative to the first shaft in the first device axial position and in the at least another device axial position, the positioning device in the first device axial position spacing the first shaft axially apart from the second shaft a first axial distance, the positioning device in the at least another device axial position spacing the first shaft axially apart from the second shaft a second axial distance, the first axial distance being different from the second axial distance, the positioning device including a first portion coupled to a second portion, the first portion mounted to the first shaft, and the second portion mounted to the splined coupling, the splined coupling including a flange disposed between the first and second portions of the positioning device.

7. The aircraft engine shaft assembly as defined in claim 6, wherein the second portion includes a flange mounted to the splined coupling and a threaded segment extending away from the flange through an opening in the splined coupling, the threaded segment coupled to the first portion of the positioning device.

8. An aircraft engine shaft assembly, comprising:
a first shaft coupled to a second shaft with a splined coupling made of an electrically-insulating material, the first and second shafts and the splined coupling being rotatable about an axis; and
a positioning device mounted to the splined coupling and to the first shaft about the axis, the positioning device being rotatable relative to the first shaft to axially displace the positioning device and the second shaft along the axis relative to the first shaft, between a first device axial position and at least another device axial position, to control an axial positon of the splined coupling and the second shaft relative to the first shaft;
wherein the positioning device and the second shaft are fixed in position relative to the first shaft in the first device axial position and in the at least another device axial position, the positioning device in the first device axial position spacing the first shaft axially apart from the second shaft a first axial distance, the positioning device in the at least another device axial position spacing the first shaft axially apart from the second shaft a second axial distance, the first axial distance being different from the second axial distance; and
wherein the first shaft defines a shaft cavity delimited by a shaft cavity side wall and a shaft cavity end wall, the first shaft having a threaded recess extending axially into the first shaft from the shaft cavity end wall, part of the positioning device disposed in the threaded recess and displaceable therein.

9. An aircraft engine shaft assembly, comprising:
a first shaft coupled to a second shaft with a splined coupling made of an electrically-insulating material, the first and second shafts and the splined coupling being rotatable about an axis; and
a positioning device mounted to the splined coupling and to the first shaft about the axis, the positioning device being rotatable relative to the first shaft to axially displace the positioning device and the second shaft along the axis relative to the first shaft, between a first device axial position and at least another device axial position, to control an axial positon of the splined coupling and the second shaft relative to the first shaft;
wherein the positioning device and the second shaft are fixed in position relative to the first shaft in the first device axial position and in the at least another device axial position, the positioning device in the first device axial position spacing the first shaft axially apart from the second shaft a first axial distance, the positioning device in the at least another device axial position spacing the first shaft axially apart from the second shaft a second axial distance, the first axial distance being different from the second axial distance; and
wherein the splined coupling has a coupling cavity delimited by a coupling cavity side wall and a coupling cavity end wall having an opening therein, part of the positioning device mounted to the coupling cavity end wall and extending through the opening therein.

10. A coupling assembly for rotatably coupling a first shaft of an aircraft engine and a second shaft of the aircraft engine, the first shaft and the second shaft being rotatable about an axis of rotation, the coupling assembly comprising:
a splined coupling made of an electrically-insulating material and having an inner wall with an inner spline arrangement engageable with the second shaft, and an outer wall with an outer spline arrangement engageable with the first shaft, the splined coupling having a cavity delimited by the inner wall and an end wall having an opening therein; and
positioning device mountable to the splined coupling and to the first shaft at one of a number of axial positions relative to the second shaft, the positioning device being rotatable relative to the first shaft to axially displace the positioning device and the second shaft along the axis of rotation relative to the first shaft, between a first device axial position and at least another device axial position, to control an axial positon of the splined coupling and the second shaft relative to the first shaft, the positioning device and the second shaft fixed in axial position relative to the first shaft in the first device axial position and in the at least another device axial position, the positioning device in the first device axial position spacing the first shaft axially apart from the second shaft a first axial distance, the positioning device in the at least another device axial position spacing the first shaft axially apart from the second shaft a second axial distance, the first axial distance being different from the second axial distance, the positioning device including a first portion coupled to a second portion, the first portion mountable to the first shaft, and the second portion mountable to the end wall of the splined coupling.

11. The coupling assembly as defined in claim 10, wherein the second portion includes a flange mountable to the end wall of the splined coupling and a threaded segment extending away from the flange and configured to extend through the opening in the splined coupling, the threaded segment configured to be coupled to the first portion of the positioning device.

12. The coupling assembly as defined in claim 11, wherein the first portion of the positioning device includes an internal cavity delimited by an internal threaded wall, the threaded segment of the second portion configured to be disposed in the internal cavity and engage with the internal threaded wall.

* * * * *